United States Patent Office 2,704,762
Patented Mar. 22, 1955

2,704,762

PRODUCTION OF 3-PYRAZOLIDONES

John David Kendall and George Frank Duffin, Ilford, England, assignors to Ilford Limited, Ilford, England, a British company No Drawing. Application August 14, 1953,
Serial No. 374,440

Claims priority, application Great Britain August 25, 1952

9 Claims. (Cl. 260—310)

This invention relates to the production of 3-pyrazolidones and particularly the substituted 3-pyrazolidones which are generally of value in compound photographic developers.

According to the present invention a process of producing 3-pyrazolidones comprises reacting a hydrazine of the general formula $RNH.NH_2$, where R is a hydrogen atom or a hydrocarbon group, with an amide of the general Formula I:

where $R_1$, $R_2$, $R_3$ and $R_4$ are hydrogen atoms or hydrocarbon groups.

The reaction apparently proceeds by the elimination of the elements of ammonia or an amine, $NH_2R_4$, and the cyclisation of the amide to yield a 3-pyrazolidone of the general Formula II:

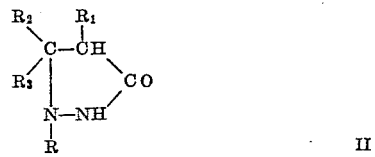

The groups $R_1$, $R_2$, $R_3$ and $R_4$ may be hydrogen atoms or lower alkyl groups, e. g. methyl, ethyl, propyl or butyl, or aryl groups, e. g. phenyl or naphthyl, or aralkyl groups, e. g. benzyl. The group R may also be a hydrogen atom or any of the aforesaid hydrocarbon groups but is preferably a phenyl group since the reagent phenyl hydrazine is readily obtainable and the products, the 1-phenyl-3-pyrazolidones, appear to be generally the most useful technically.

The reaction is preferably carried out in anhydrous conditions and in the presence of a strong basic condensing agent. It has been found that the reaction proceeds more easily and completely as the base used is stronger, and for this reason it is preferred to use strong inorganic bases such as the alkali bases. Very strong bases such as the alkali alkoxides are preferred, and the best results are obtained if these are used in equimolecular proportion to the other reagents or in slight excess over that proportion.

The following examples will serve to illustrate the invention:

EXAMPLE 1

4-methyl-1-phenyl-3-pyrazolidone

Sodium (3 g.) was dissolved in ethanol (50 cc.) and phenyl hydrazine (10 cc.), and α-methylacrylamide (8.5 g.) added to the solution, which was then refluxed for two hours, during which time ammonia was evolved. The solution was evaporated to dryness under reduced pressure, the residue dissolved in water (50 cc.) and the resulting solution acidified with glacial acetic acid (7.5 cc.). A crystalline precipitate rapidly deposited and recrystallisation of the solid from carbon tetrachloride yielded colourless plates, m. pt. 135°, of pure 4-methyl-1-phenyl-3-pyrazolidone.

EXAMPLE 2

1-phenyl-3-pyrazolidone

Sodium (3.0 g.) was dissolved in ethanol (100 cc.) and phenylhydrazine (10 cc.) and acrylamide (7.1 g.) added to the solution in that order. After refluxing for three hours the solution was evaporated to dryness, under reduced pressure, and the residue taken up in water (50 cc.). The addition of acetic acid (7.5 cc.) to this solution precipitated a white crystalline mass. Recrystallisation of the filtered solid from water gave pure 1-phenyl-3-pyrazolidone as colourless needles, m. pt. 121°.

EXAMPLE 3

1-phenyl-3-pyrazolidone

Sodium (2.2 g.) was dissolved in ethanol (72 cc.) and then phenylhydrazine (7.2 cc.) and N-ethylacrylamide (7.2 g.) added to the solution in that order. After refluxing for two hours the solution was evaporated, under reduced pressure, to dryness. The residue was taken up in water (50 cc.) and acetic acid (5.6 cc.) added. A crystalline mass was precipitated almost immediately which, after filtration and crystallisation from water, gave pure 1-phenyl-3-pyrazolidone as colourless needles, m. pt. 121°.

EXAMPLE 4

1:5-diphenyl-3-pyrazolidone

Sodium (0.65 g.) was dissolved in ethanol (25 cc.) and cinnamide (3.7 g.) and phenylhydrazine (2.2 cc.) added to the solution which was then refluxed for four hours. The solution was evaporated to dryness, the residue dissolved in water (50 cc.) and acetic acid (2.2 cc.) added. The precipitated solid was filtered off and recrystallised from methanol to give pure 1:5-diphenyl-3-pyrazolidone as colourless plates, m. pt. 159°.

EXAMPLE 5

5:5-dimethyl-1-phenyl-3-pyrazolidone

Sodium (0.84 g.) was dissolved in ethanol (30 cc.) and phenylhydrazine (2.88 cc.) and β:β-dimethylacrylethylamide (3.65 g.) added to the solution which was then refluxed for 15 hours. After evaporation of the solution to dryness under reduced pressure, the residue was taken up in water (30 cc.) and acetic acid (2.7 cc.) added. An oil was precipitated which, on lixiviation with benzene, gave a crystalline precipitate. Recrystallisation of this solid from benzene gave 5:5-dimethyl-1-phenyl-3-pyrazolidone as colourless plates, m. pt. 166°.

EXAMPLE 6

5-methyl-1-phenyl-3-pyrazolidone

Sodium (3.18 g.) was dissolved in ethanol (100 cc.) and phenylhydrazine (10.5 cc.) and crotonamide (9 g.) added to the solution, which was then refluxed for two hours. After evaporation of the solution to dryness under reduced pressure, the residue was taken up in water (100 cc.) and acetic acid (12 cc.) added. A solid was rapidly precipitated which was filtered off and recrystallised from ethanol to give 5-methyl-1-phenyl-3-pyrazolidone as colourless rhombs, m. pt. 125°.

By analogous procedures, the following pyrazolidones are prepared:

EXAMPLE 7

1-p-tolyl-3-pyrazolidone

From p-tolyl hydrazine and acrylamide in the presence of an excess of sodium ethoxide. The product crystallises from benzene as colourless plates, m. pt. 163° C.

EXAMPLE 8

1-p-chlorphenyl-3-pyrazolidone

From p-chlorphenyl hydrazine and acrylamide in the presence of an excess of sodium ethoxide. The product crystallises from benzene as colourless plates, m. pt. 117° C.

EXAMPLE 9

1-p-anisyl-3-pyrazolidone

From p-anisyl hydrazine and acrylamide in the presence of an excess of sodium ethoxide. The product crystallises from benzene as colourless needles, m. pt. 146° C.

EXAMPLE 10

*1-p-chlorphenyl-4-methyl-3-pyrazolidone*

From p-chlorphenyl hydrazine and α-methyl acrylamide. The product crystallises from carbon tetrachloride as colourless needles, m. pt. 117° C.

What we claim is:

1. A process for the production of a 3-pyrazolidone which comprises heating a hydrazine of the general formula: $RNH.NH_2$ with an amide of the general formula:

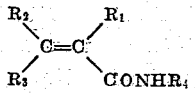

where R, $R_1$, $R_2$, $R_3$ and $R_4$ are each selected from the class consisting of the hydrogen atom and methyl, ethyl, propyl, butyl, phenyl, naphthyl, benzyl, tolyl, chlorphenyl and methoxyphenyl groups.

2. A process for the production of a 3-pyrazolidone which comprises heating phenyl hydrazine with acrylamide.

3. A process for the production of a 3-pyrazolidone which comprises heating phenyl hydrazine with an N-alkyl acrylamide.

4. A process for the production of a 3-pyrazolidone which comprises heating a hydrazine of the general formula $RNH.NH_2$ with an amide of the general formula:

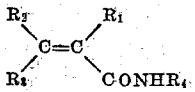

where R, $R_1$, $R_2$, $R_3$ and $R_4$ are each selected from the class consisting of the hydrogen atom and methyl, ethyl, propyl, butyl, phenyl, naphthyl, benzyl, tolyl, chlorphenyl and methoxyphenyl groups under substantially anhydrous conditions and in the presence of a strong basic condensing agent.

5. A process for the production of a 3-pyrazolidone which comprises heating phenyl hydrazine with acrylamide under substantially anhydrous conditions and in the presence of a strong basic condensing agent.

6. A process for the production of a 3-pyrazolidone which comprises heating phenyl hydrazine with an N-alkyl acrylamide under substantially anhydrous conditions and in the presence of a strong basic condensing agent.

7. A process for the production of a 3-pyrazolidone which comprises heating a hydrazine of the general formula $RNH.NH_2$ with an amide of the general formula:

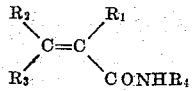

where R, $R_1$, $R_2$, $R_3$ and $R_4$ are each selected from the class consisting of the hydrogen atom and methyl, ethyl, propyl, butyl, phenyl, naphthyl, benzyl, tolyl, chlorphenyl and methoxyphenyl groups under substantially anhydrous conditions and in the presence of at least an equimolecular quantity of alkali alkoxide.

8. A process for the production of a 3-pyrazolidone which comprises heating phenyl hydrazine with acrylamide under substantially anhydrous conditions and in the presence of at least an equimolecular quantity of alkali alkoxide.

9. A process for the production of a 3-pyrazolidone which comprises heating phenyl hydrazine with an N-alkyl acrylamide under substantially anhydrous conditions and in the presence of at least an equimolecular quantity of alkali alkoxide.

References Cited in the file of this patent

UNITED STATES PATENTS

| | | |
|---|---|---|
| 2,289,367 | Kendall | July 14, 1942 |

FOREIGN PATENTS

| | | |
|---|---|---|
| 41,936 | Germany | Jan. 31, 1888 |
| 53,834 | Germany | Sept. 17, 1890 |
| 67,213 | Germany | Feb. 6, 1893 |
| 451,732 | Germany | Nov. 1, 1927 |
| 650,911 | Great Britain | Mar. 7, 1951 |
| 673,623 | Great Britain | June 11, 1952 |
| 679,677 | Great Britain | Sept. 24, 1952 |
| 679,678 | Great Britain | Sept. 24, 1952 |

OTHER REFERENCES

Spasov et al.: Chemical Abstracts, vol. 44, p. 1491 (1950).